Patented Sept. 1, 1931

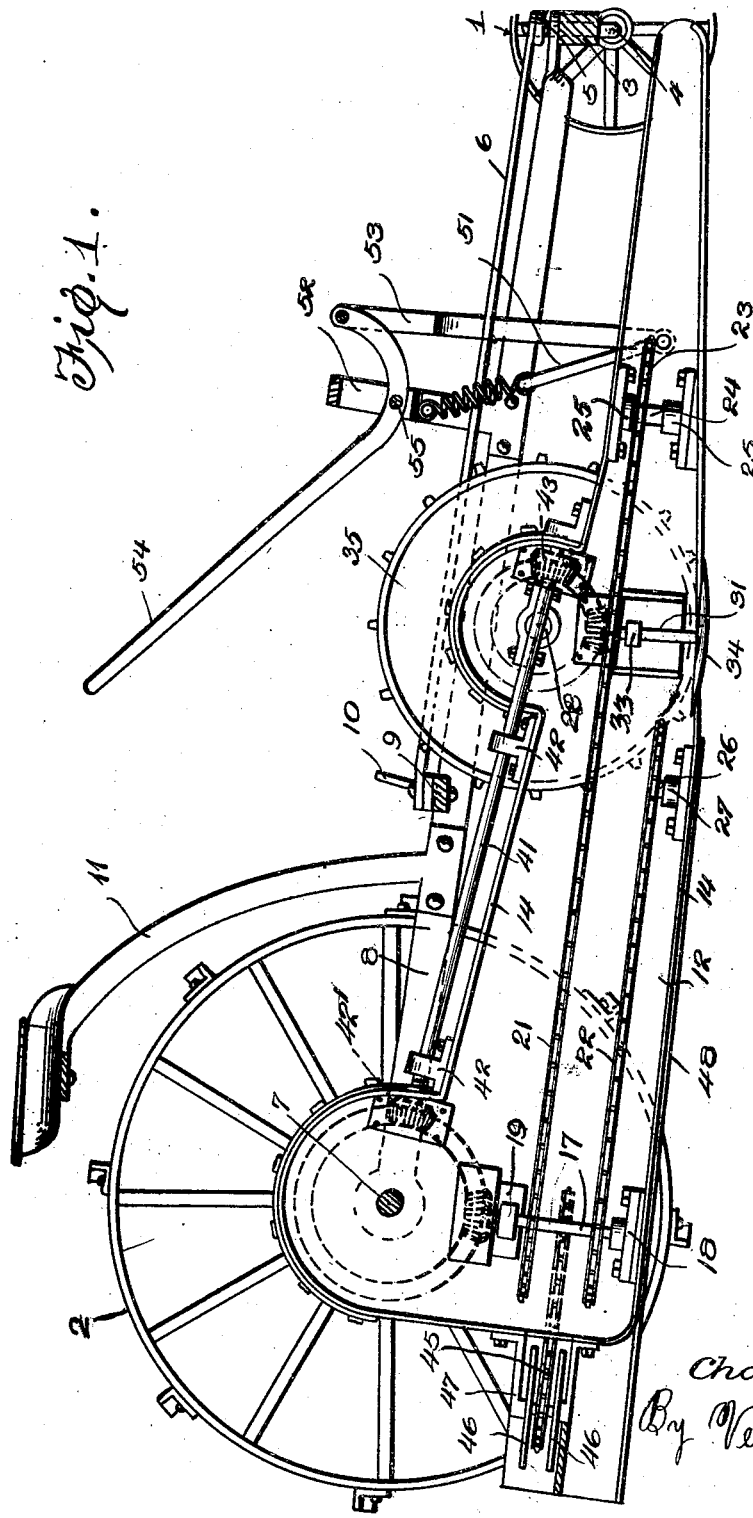

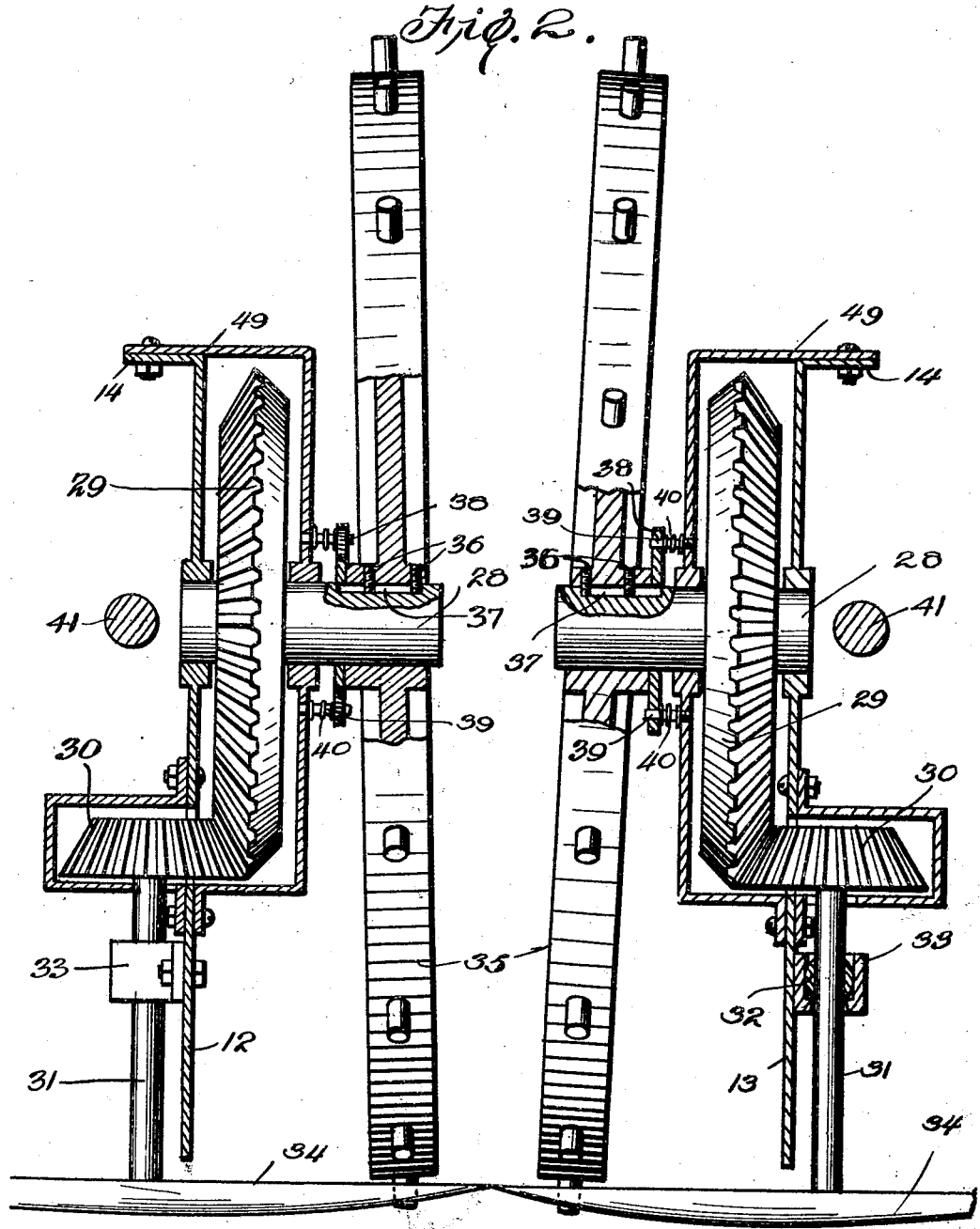

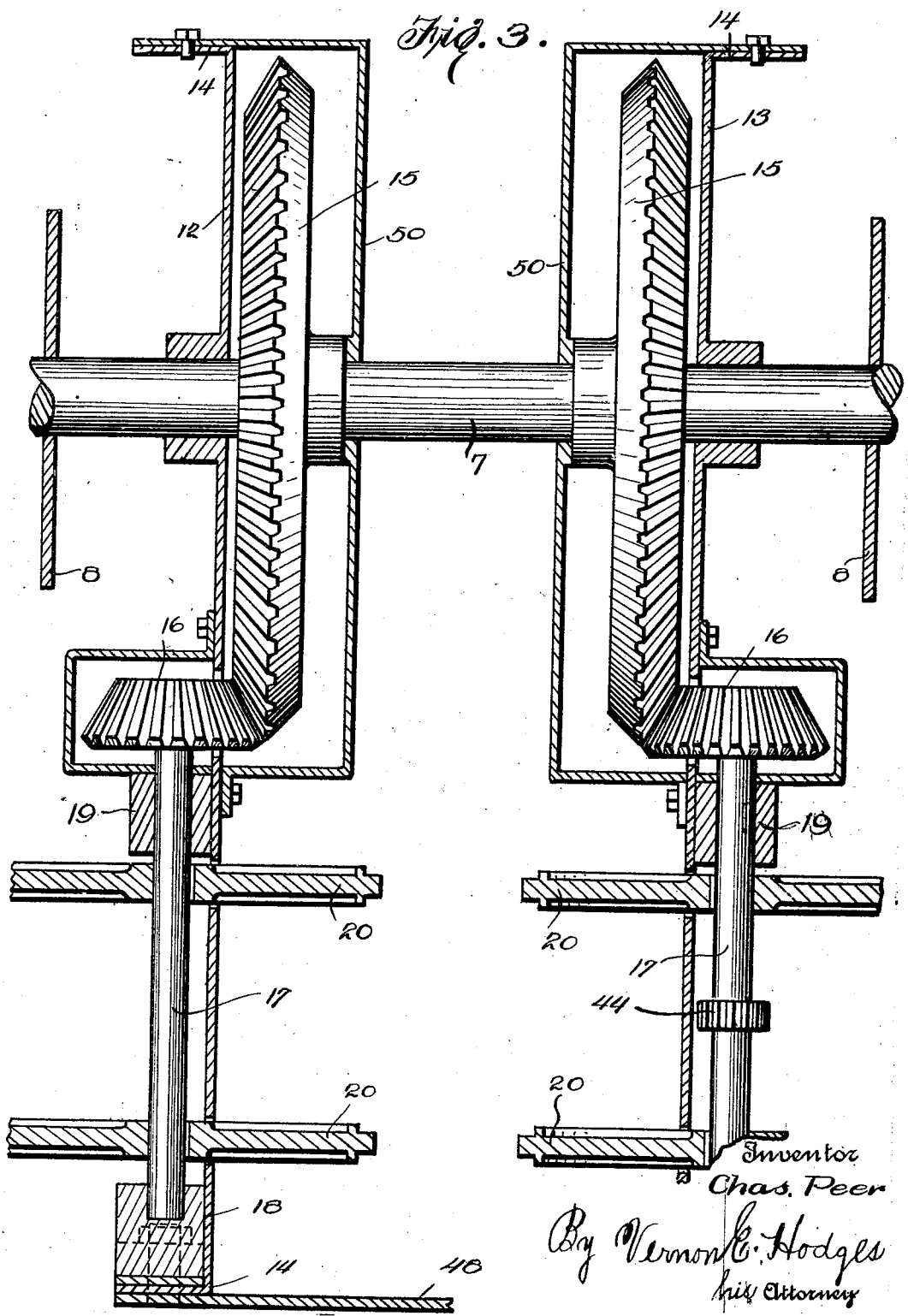

1,821,573

UNITED STATES PATENT OFFICE

CHARLES PEER, OF BRUSH, COLORADO

SUGAR BEET TOPPING MACHINE

Application filed December 30, 1926. Serial No. 158,036.

This invention relates to an improvement in sugar beet topping machine.

The object of this invention is to provide a simple and efficient mechanism for cutting the tops from sugar beets of any various sizes and to convey such tops, after being cut, to the rear of the machine for discharge laterally between the rows of sugar beets.

It is also the purpose of this invention to allow an automatic adjustment of the cutting mechanism with relation to the sugar beet tops in order to cut off all of the tops of either large or small beets.

With these objects in view, the invention comprises a frame-work which supports housings on opposite sides of the machine for gearing, which connects the cutting disks with the rear axle of the machine, in order to actuate such disks upon the propelling of the machine. Wheels are also provided and mounted upon shafts carried by said housings and driven through the gearing mounted in the housings, in order to be moved up over and around the sugar beet tops to carry the housings about such tops and to bring the cutting disks into proper relation therewith, for cutting off the tops near the sugar beets. Chain conveyors pass through the housings, in order to convey the cut tops to the rear of the machine where they pass over a platform and are discharged between the rows of sugar beets.

In the accompanying drawings:—

Fig. 1 is a side elevation partly in section of the complete machine;

Fig. 2 is a vertical sectional view partly in side elevation through the cutting mechanism and driving gears therefor; and Fig. 3 is a similar view through the housings and gearing connected with the rear axle.

As shown in Fig. 1, the machine is provided with front and rear wheels 1 and 2, respectively, the front wheels 1 being connected with a transverse bar 3 by means of stub axles 4 which are mounted in the wheels and extend upwardly through the opposite ends of the bar 3, having their upper ends turned inwardly as at 5 and connected with the links 6 which extend toward the rear of the machine. The rear wheels 2 carry the rear axle 7. Bars 8 extend from the rear axle 7 to the front-bar 3 substantially at the opposite ends thereof and form connecting links between these two sections of the machine while also serving as the main supporting frame therefor.

The rear ends of the bars 8 preferably receive the axle 7, as shown in dotted lines in Fig. 1, and are supported by such rear axle. Extending transversely between the bars 8 is a guide-bar 9, supporting the foot-pedals 10, to which the links 6 are connected, in order to guide the machine by turning the stub shafts 4 and the front wheels 1. A seat 11 is mounted upon the supporting bars 8 extending upwardly therefrom for the use of the operator. Any suitable draft means may be provided for the machine and connected with the front axle or supporting-bar 3, as desired.

Supporting plates 12 and 13 are provided on opposite sides of the machine and extend substantially from the front to the rear thereof, as shown in Fig. 1, said plates being substantially triangular in shape with the apex at the front end of the machine, as clearly shown in Fig. 1. The plates 12 and 13 have the upper and lower edges thereof bent outwardly in the form of flanges 14.

Mounted on the rear axle 7 in spaced apart relation as shown in Fig. 3 are the driving gears 15 meshing with pinions 16, fixed upon substantially vertical shafts 17, on opposite sides of the machine. The lower ends of the shafts 17 are mounted in thrust-bearings 18 carried by the flanges 14, as shown in Figs. 1 and 3, and the upper ends of said shafts are received in bearings 19. Fixed on the shafts 17 are chain wheels 20 which receive sprocket chains 21 and 22, the upper sprocket chain 21 extending substantially to the front of the plates 12 and 13 and being mounted upon a sprocket wheel 23 carried by stub shaft 24 mounted in bearings 25, supported by the flanges 14 of the plates 12 and 13. The lower sprocket chain 22 passes around the sprocket wheel carried by a stub shaft 26, mounted in the bearing 27, also supported upon the flanges 14 of the plates 12 and 13, at points intermediate of the front sprocket wheels 23 and the driving sprocket wheels 20. Mounted in the plates 12 and 13 at a point intermediate the front and rear wheels 1 and 2 are stub shafts 28, upon which are fixed gears 29, and driven pinions 30 mounted on shafts 31 mesh with such driven gears 29. The shafts 31 are mounted on balls 32 carried in sockets 33 fixed to the plates 12 and 13 and form a support for such shafts 31.

The lower ends of the shafts 31 have the cutting disks 34 fixed thereon to be revolved for cutting the tops from the sugar beets. Mounted on the stub shafts 28 are gauge wheels 35, which as shown in Fig. 2 are slightly tilted at an angle to said stub shafts and these wheels 35 are adapted to turn with the stub shafts but are permitted to slide outwardly thereon, by reason of the pins 36 and slots 37, as shown in Fig. 2. Plates 38 receive pins 39, about which springs 40 are mounted, for normally tending to press the wheels 35 inwardly toward each other. The plates 38 abut against the hubs of the wheels for resiliently holding such wheels in their inward positions.

Drive shafts 41 are mounted in bearings 42 upon the upper flanges 14, as shown in Fig. 1, and extend from the rear of the machine toward the front thereof. The driving shafts 41 have driving pinions 42' fixed on the rear ends thereof which pinions mesh with the rear driving gears 15, as shown in Fig. 1. The front ends of the driving shafts 41 have driven pinions 43 thereon for meshing with the driven gears 29, in order to rotate such gears and the wheels 35 and cutting disks 34 from the rear axle and wheels of the machine. Mounted on one of the shafts 17 between the two sprocket gears 20 and carried thereby is a sprocket pinion 44 for driving a sprocket chain 45, which drives rotating fingers 46 supported on a shaft carried in brackets 47 at the rear of the machine as shown in Fig. 1. A plate 48 is attached to the bottom flanges 14 and extends across between the plates 12 and 13 and substantially from the cutting disks 34 to the rear of the machine extending under the fingers 46, in order to support the tops of the sugar beets during their passage from the cutting disks to the rear of the machine and to allow such tops to be thrown laterally by the fingers 46 between the rows of sugar beets.

Housings 49 are secured to the plates 12 and 13 and to the flanges 14 thereof, about the gears 29 and the stub shafts 28, as shown in Fig. 2, and these housings 49 support the pins 39 to carry the springs 40. Similar housings 50 are provided for the rear driving gears 15.

The front ends of the plates 12 and 13 are supported upon a spring carried yoke 51, which extends to and is connected with the transverse member 52, which extends between the supporting rods 8. Links 53 also support the front ends of the plates 12 and 13, as shown in Fig. 1, and a lever 54 is pivotally connected with the links 53 and said lever is pivotally mounted at 55 in the member 52, in order to elevate the front ends of the plates 12 and 13 and to hold the cutting disks 34 and wheels 35 away from the ground when the machine is not in use.

In operation, the machine is drawn over a row of sugar beets, with the tops thereof passing between the wheels 35, and the tops are severed from the beets by means of the cutting disks 34 which are rotated through the gears 29, 30, 42' and 15, and the shafts 31 and 41 from the rear axle of the machine. The tops are carried rearwardly by means of the sprocket chains or conveyors 21 and 22 and during the rearward passage these tops are supported upon the plate or platform 48, between the plates 12 and 13. At the rear of the machine, the tops are received and thrown laterally between the rows by means of the fingers 46, rotated through the chain 45 from one of the rear shafts 17. The machine is guided, if desired, by means of the foot-pedals 10, links 6, and front axles 4.

The resilient mounting for the wheels 35 causes them to pass around the tops of large sugar beets and brads or pins may be formed on such wheels for causing the same to be pulled upon the beets instead of pushing the beets rearwardly. The ball and socket mounting for the shafts 31 and the cutting disks 34 causes the disks to be rocked whenever the wheels 35 are raised up over a beet crown, the shafts 31 rocking rearwardly in order to cause the disks to sever the tops at lower points.

I claim:

1. A machine of the character described including a frame, supporting wheels therefor, supporting plates extending longitudinally of said machine, cutting means carried thereby, conveyors associated with said cutting means, resilient means normally tending to hold the supporting plates in their lowered positions, links connected with the supporting plates and extending upwardly therefrom, and a lever mounted on the main frame and connected with the links for raising and lowering the supporting plates, out of and into the operative positions.

2. A machine of the character described including a frame, supporting wheels therefor, supporting plates extending longitudinally of said machine, cutting means carried by said plates, conveyors associated with said cutting means, a spring supported yoke carrying the front ends of the supporting plates, links connected with and extending upwardly from said front ends, and a lever mounted on the main frame and connected with the links for raising and lowering the supporting plates.

3. A machine of the character described including supporting wheels, an axle connecting said wheels together and rotated thereby, supporting plates carried by said axle, drive shafts mounted on and extending longitudinally of said supporting plates and geared to the axle, disk shafts mounted on said plates and geared to said drive shafts, cutting disks fixed on the disk shafts, and conveyors associated with the cutting disks and driven from the axle.

4. A machine of the character described including supporting wheels, a drive axle connecting said wheels together and rotated thereby, supporting plates mounted on said axle, drive shafts mounted on and extending longitudinally of said supporting plates and geared to the axle, disk shafts universally supported on the plates, and geared to said drive shafts, cutting disks fixed on the disk shafts, conveyor shafts geared to the drive axle, and endless conveyors driven by said shafts and associated with the cutting disks.

5. A machine of the character described including a frame, cutting disks mounted thereon, rotary disks shafts for supporting and driving said cutting disks, stub shafts mounted in said frame and geared to said cutting disks, gage wheels slidably mounted on said stub shafts, and driving means for the wheels and cutting disks.

6. A machine of the character described including a frame, disk shafts universally mounted on said frame, cutting disks carried by said disk shafts, stub shafts mounted in the frame, tilted gage wheels slidably mounted on said stub shafts, and rotatable therewith, and driving means for the stub and disk shafts.

7. A machine of the character described including a frame, cutting means carried thereby, stub shafts mounted in the frame, and gauge wheels slidably mounted on the stub shafts and associated with the cutting means.

8. A machine of the character described including a frame, rotary coacting cutting disks carried by the frame, shafts mounted in the frame and carrying the disks and means for varying the angle of the shafts to the supporting frame and in the plane in which the machine is traveling according to the size of the objects to be cut.

9. In a machine of the character described, the combination of rotary coacting cutting disks, shafts carrying said disks, a frame supporting the shaft and means for swinging said shafts relative to the supporting frame and in planes parallel with the direction of travel of the machine to vary the depth of the cut.

10. In a machine of the character described, the combination of a frame, cutting means carried thereby, stub-shafts carried by the frame, and gauge means carried thereby for lateral sliding movement and associated with the cutting means.

11. A machine of the character described comprising a main drive shaft, supporting plates extending longitudinally of the machine, drive shafts journaled in the plates and extending longitudinally thereof, said drive shafts being operatively connected with the first-mentioned main drive shaft, and cutting disks operatively connected with and driven from the drive shaft.

12. A machine of the character described comprising a main drive shaft, supporting plates each having one end connected with the main drive shaft, drive shafts journaled in the plates and extending longitudinally thereof, one end of each of the drive shafts being geared to the main drive shaft and driven therefrom, and a cutting disk operatively connected with and driven from the opposite end of each of the drive shafts.

13. A machine of the character described comprising a main drive shaft, supporting plates each having one end connected with the main drive shaft, drive shafts journaled in the plates and extending longitudinally thereof, one end of each of the drive shafts being geared to the main drive shaft and driven therefrom, a cutting disk operatively connected with and driven from the opposite end of each of the drive shafts, and a conveyor associated with the cutting disk and driven from the main drive shaft independent of the second-mentioned drive shafts.

14. In a machine of the character described, a frame, a cutting element, a shaft carrying said cutting element, and a pivotal support for the shaft in the frame permitting the shaft to tilt at its point of support.

In testimony whereof I affix my signature.

CHARLES PEER.